2,721,392

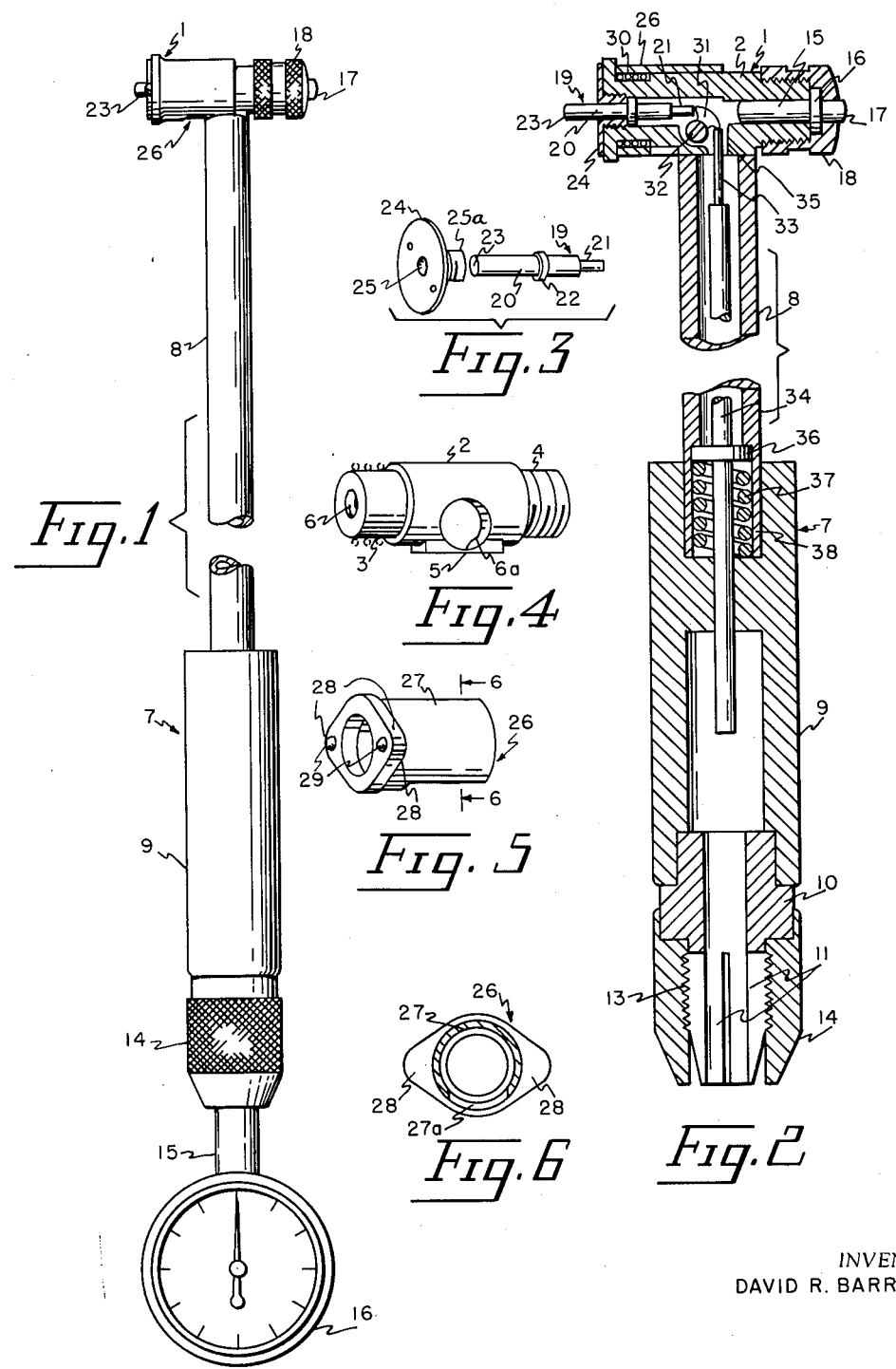

CYLINDER OR HOLE GAUGE

David R. Barrett, Batavia, N. Y.

Application June 5, 1952, Serial No. 291,961

1 Claim. (Cl. 33—178)

This invention relates to a gauge for measuring the interior diameter of cylinder bores.

In such devices the calibration is done by means of a fixed button and a slidable plunger button. To insure accurate measurement it is necessary that these lie upon a diameter and not a chord of the cylinder being measured. To insure this it is usual to provide two spring pressed members to engage the cylinder wall, these being at the extremities of a chord at the center of which is the slidable measuring plunger button. This button must therefore travel along a diameter and not a chord in accordance with a well known geometrical principle, and the fixed button has been placed so that it must also lie upon this diameter. One object of this invention is to provide a better arrangement of these centralizing members in which they lie upon a single member and are moved by a single spring.

It is also necessary to have provision for replacing the fixed measuring button with another of different length in order to increase the measuring range of the instrument.

Another object is to provide a simple arrangement by which such changes can quickly be made.

These and other related objects are obtained by the means illustrated in the attached drawings, set forth in the following specification, and particularly pointed out in the claim.

In the drawings in which like numerals refer to like parts:

Fig. 1 is a broken plan of the device as a whole;

Fig. 2 is a longitudinal broken section taken on a center line;

Fig. 3 is an exploded perspective view of two closely related detail parts;

Fig. 4 is a perspective view of one member;

Fig. 5 is a perspective view of another member;

Fig. 6 is a section on line 6—6 of Fig. 5, looking in the direction of the arrows.

As shown by Figs. 1 and 2, the device has two main parts, a cylindrical head denoted as a whole by 1, and a long cylindrical portion denoted as a whole by 7, these parts being at right angles to each other.

Considering first the head 1 as seen in Figs. 1, 2 and 4, this has a main cylindrical body portion 2 shown best in Fig. 4. This has at one end an extension 3 of reduced diameter, and at the other end another extension 4 of reduced diameter which is threaded. A generally cylindrical opening 6 of varying diameters and threaded at its left end extends entirely through this head. Into the right hand end of the opening 6 extends the fixed measuring button or contact 15 of cylindrical form and having a stop collar 16, and a hemispherical end 17. This contact button is retained in place within the cylindrical body member 2 by the cap 18 which is internally threaded to correspond to the threaded end 4 of the cylindrical body member 2. The stop collar 16 is thus brought snugly against the right hand end of cylindrical body member 2, and it is evident that contacts 15 of different lengths (not shown) may readily be interchanged.

At the left end of the body 1 are the parts shown in detail by the assembly 19 of Fig. 3. Of these, the slidable measuring plunger 20 is of uniform diameter with an extension 21 of reduced diameter and a stop collar 22. This stop collar 22 is of a diameter to slidably engage the unthreaded portion of the opening 6 in the cylindrical body member 2 as seen by Fig. 2, and the end of the reduced extension 21 abuts against the left face of a rotatable sector 31 to be referred to later. The left end 23 of plunger 20 slidably engages in an opening 25 within a disc like member 24 provided with an externally threaded nipple 25a which threads into the threaded portion of the hole 6 in the cylindrical body member 2, the nipple bearing against the stop collar 22 on the movable measuring plunger 20, and also serving as a guide for this plunger 20. The projecting end 23 of the plunger 20 is of hemispherical form as shown by Figs. 1, 2 and 3. As shown by Figs. 1 and 2 upon the cylindrical body member 2 is slidably mounted the bushing 26 shown in detail in Figs. 5 and 6. A spiral compression spring 30 is mounted upon the left hand reduced neck portion 3 of the cylindrical body member 2, this spring 30 tending to urge the bushing 26 to the left, but this movement being limited by the disc 24. Referring to Figs. 5 and 6, it will be seen that on the left end of the cylindrical portion 27 of the bushing 26 are two diametrically opposite ears 28 extending outside of the area covered by the overlying disc 24. Upon each ear 28 is a hemispherical contact bead 29. Referring to Fig. 2, it will be seen that at the longitudinal center of the opening 6 in the cylindrical body member 2, there is pivotally mounted a sector 31 upon a screw 32 threaded into the cylindrical body member 2. The left face of this sector 31 engages the end 21 of the measuring plunger 20, while the right face engages a plunger 33 to be referred to later.

Referring again to Fig. 4, it will be seen that the cylindrical body member 2 at the bottom has a rectangular lug 5 to engage a correspondingly cut out portion of the cylindrical member 7, while an opening 6a through the wall permits access to the parts lying in the central opening 6. The head 1 and long cylindrical member 7 after being brought into engagement are secured in any appropriate manner and a longitudinal slot 27a at the bottom right end of the bushing 26 allows it to have necessary movement without obstruction by the connection between the head 2 and the long cylinder 7.

Referring now to the elongated cylindrical member 7, this is clearly shown by Figs. 1 and 2. This has a hollow cylindrical part 8 which at its lower end enters a socket in the enlarged handle portion 9 into the lower end of which is screwed the jaw member 10 of a chuck, this having a thread portion 13 to receive the usual chuck sleeve 14. This chuck receives the stem 15 of a conventional dial indicator 16 which it is not necessary to describe.

Contacting the right hand face of the sector 31 is the reduced end 33 of a plunger 34 slidably mounted in the enlargement 9 which serves as a plunger guide. This contact of the plunger end 33 with the sector is permitted by means of the opening 35 in the cylindrical body member 2. The plunger 34 has a collar 36 bearing against a compression spring 37 located in an enlarged portion 38 of the interior of the cylindrical member 7. This spring 37 tends to urge the upper end 33 of the plunger 34 into contact with the sector 31 and through it transmit outward movement to the movable measuring contact 20; and, from a reverse point of view, the measuring plunger 20 transmits movement to the rod 34 which through well known connections actuates the hand of the dial indicator 16.

The operation is as follows. First an appropriate fixed measuring contact or button 15 is mounted in the head 1 by means of cap 18. The device is then introduced into the cylinder or hole to be measured, the sleeve 26 being pressed inwardly against the resistance of the spring 30 and the beads 29 thus forced into contact with the interior wall. Due to these, the movable measuring contact 20 moves inwardly along a diametrical line and transmits movement to the sector 31 which moves the plunger 34 to actuate the indicator 16. Its reading having been taken, the device is removed from the hole to be measured and by means of a micrometer applied to the contacts 15 and 20, the indicator is brought back to the noted reading. The micrometer reading at this point is the desired diameter.

It will thus be seen that this device has two valuable improvements. By making the fixed measuring contacts as shown, each one does not have to be threaded as is usual, but one threaded cap holds each one as desired, the measuring contacts being of various lengths for measuring different diameter bores. This cap may be more readily screwed on and off than a button screwed into a hole, it being generally necessary to provide some additional means to keep the contact from unscrewing. Also by mounting the centralizing contacts upon a common sleeve there is avoided the multiplication of springs and the necessity of drilling a hole for each contact.

While the device has been shown and the structure described in detail, it is obvious that this invention is not to be considered as being limited to the exact form disclosed, and that changes in detail and construction may be made therein within the scope of what is claimed, without departing from the spirit of this invention.

The device having been thus described, what is claimed is:

In a cylinder or bore gauge having an elongated cylindrical member and a cylindrical body portion secured at a right angle at one end thereof, said member being adapted and arranged to support a dial indicator at its other end and said body portion having a replaceable fixed button contact at one end and a sliding measuring plunger at the other, there being means in said member and said body portion adapted and arranged to actuate said dial indicator in response to measuring movement of said plunger with respect to said contact; the improvement comprising a sleeve slidable on said body portion at said other end, said sleeve being formed at one end with a slot receiving said cylindrical member at its point of attachment to said body portion and at its other end with a pair of outwardly extending diametrically opposed ears disposed transversely thereon with respect to said slot, a hemispherical bead on each ear at a spaced distance on each side of said plunger, and spring means biasing said sleeve outwardly whereby said beads may engage the wall of a bore on each side of said plunger for centering said plunger and said contact at diametrically opposed positions in the bore.

References Cited in the file of this patent

UNITED STATES PATENTS

| 347,844 | Usher | Aug. 24, 1886 |

FOREIGN PATENTS

| 875,477 | France | Sept. 23, 1942 |
| 238,163 | Switzerland | Oct. 1, 1945 |
| 241,692 | Switzerland | June 17, 1946 |
| 919,352 | France | Mar. 6, 1947 |
| 419,983 | Italy | Apr. 14, 1947 |